United States Patent
Eder et al.

(10) Patent No.: US 7,630,799 B2
(45) Date of Patent: Dec. 8, 2009

(54) FLIGHT SENSOR FOR ELECTRONIC COMPONENTS FOR USE IN AIRCRAFT, METHOD OF CONTROLLING ELECTRONIC COMPONENTS ON BOARD AIRCRAFT, AND ELECTRONIC COMPONENT

(75) Inventors: Johannes Eder, Vaterstetten (DE); Kurt-Volker Hechtenberg, Bruckmuehl (DE); Juergen Halm, Ganderkesee/Redhorn (DE)

(73) Assignees: EADS Deutschland GmbH, Ottobrunn (DE); Airbus Deutschland GmbH, Hamburg (DE)

( * ) Notice: Subject to any disclaimer, the term of this patent is extended or adjusted under 35 U.S.C. 154(b) by 565 days.

(21) Appl. No.: 11/597,642

(22) PCT Filed: May 14, 2005

(86) PCT No.: PCT/DE2005/000885

§ 371 (c)(1),
(2), (4) Date: Nov. 27, 2006

(87) PCT Pub. No.: WO2005/116592

PCT Pub. Date: Dec. 8, 2005

(65) Prior Publication Data

US 2007/0225875 A1    Sep. 27, 2007

(30) Foreign Application Priority Data

May 28, 2004    (DE)    ........................ 10 2004 026 711

(51) Int. Cl.
*G06F 19/00*    (2006.01)
(52) U.S. Cl. .................................... 701/15
(58) Field of Classification Search ............ 701/3, 701/8–9, 14–15; 340/945, 963; 244/171, 244/75.1; 702/1
See application file for complete search history.

(56) References Cited

U.S. PATENT DOCUMENTS 3,070,995 A    1/1963    Broder et al.

(Continued)

FOREIGN PATENT DOCUMENTS

DE    39 16727 A1    11/1990

(Continued)

OTHER PUBLICATIONS

International Preliminary Report on Patentability dated Dec. 7, 2006, including English translation and PCT/ISA/237 (Written Opinion of the International Searching Authority) (sixteen (16) pages).

(Continued)

*Primary Examiner*—Yonel Beaulieu
(74) *Attorney, Agent, or Firm*—Crowell & Moring LLP

(57) ABSTRACT

A flight sensor for controlling electronic components in an aircraft includes a vibration sensor for converting structure-borne sound to electric vibration signals. A filtering device receives the vibration signals and determines the fraction thereof which is attributable to the aircraft engine, relative to the overall sound in the vibration signals. A comparator compares the engine sound with the overall sound and generates a flight condition signal based on the result of the comparison, which flight condition signal indicates a defined flight status of the aircraft, such as "flight" or "no flight". Electronic components on board an aircraft are controlled such that the emission of interfering electromagnetic waves is prevented when the flight status signal indicates that the aircraft is in flight.

15 Claims, 1 Drawing Sheet

U.S. PATENT DOCUMENTS

| | | | |
|---|---|---|---|
| 4,581,571 A | | 4/1986 | Hansen |
| 4,849,655 A | * | 7/1989 | Bennett .................. 73/514.31 |
| 5,004,963 A | | 4/1991 | Hay |
| 5,748,748 A | | 5/1998 | Fischer et al. |
| 5,784,300 A | | 7/1998 | Neumeier et al. |
| 6,176,136 B1 | | 1/2001 | Zoppitelli et al. |
| 6,301,572 B1 | | 10/2001 | Harrison |

FOREIGN PATENT DOCUMENTS

| | | |
|---|---|---|
| DE | 195 31 402 A1 | 2/1997 |
| DE | 297 20 639 U1 | 1/1998 |
| DE | 198 43 616 A1 | 4/2000 |
| DE | 100 12 926 C2 | 10/2001 |
| DE | 10 2004 026 711 A1 | 12/2005 |
| EP | 0 286 120 A2 | 10/1988 |
| EP | 0 856 999 A2 | 8/1998 |
| EP | 1 209 468 A1 | 6/2002 |
| EP | 1 378 446 A1 | 1/2004 |

OTHER PUBLICATIONS

International Search Report dated Aug. 16, 2005 including an English translation of the pertinent portions (Sixteen (16) pages).

* cited by examiner

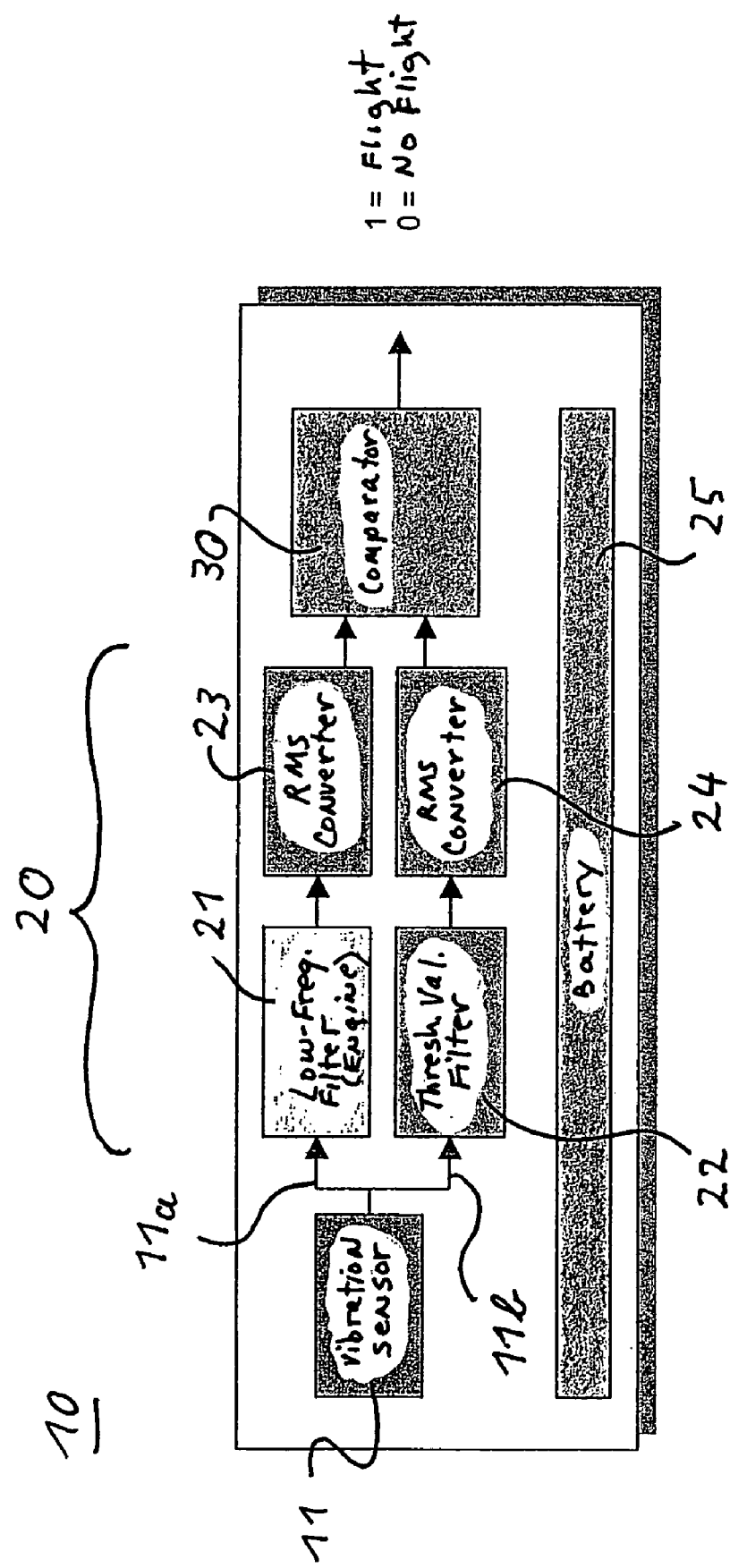

FLIGHT SENSOR FOR ELECTRONIC COMPONENTS FOR USE IN AIRCRAFT, METHOD OF CONTROLLING ELECTRONIC COMPONENTS ON BOARD AIRCRAFT, AND ELECTRONIC COMPONENT

BACKGROUND AND SUMMARY OF THE INVENTION

This application claims the priority of German patent document 10 2004 026 711.1, filed May 28, 2004 (PCT International Application No. PCT/DE2005/000885, filed May 14, 2005), the disclosures of which are expressly incorporated by reference herein.

The present invention relates to an electronic component for use in aircraft and to a flight sensor for such components, as well as a method of controlling electronic components on board aircraft.

On board an aircraft, for safety reasons it must be ensured that electromagnetic waves do not interfere with the aircraft's systems. All electronic components intended for installation in aircraft therefore require a special permit to assure that they do not emit interfering radio waves or electromagnetic waves and thereby impair the safety of the aircraft operation. This special permit can be granted only if it is established that the component emits no interfering or safety-impairing radio waves during the flight.

Such approval procedures, however are very costly, and fault sources may occur despite the high-expenditure approval procedure.

One object of the present invention, therefore, is to increase the safety for the use of electronic components in aircraft.

Another object of the invention is to permit a simpler approval of components emitting radio waves.

These and other objects and advantages are achieved by the flight sensor according to the present invention, which is suitable particularly for use in aircraft, and which comprises a vibration sensor for converting structure-borne sound to electric vibration signals. A filtering device receives the vibrations signals, for determining the fraction thereof that is attributable to engine sounds of the aircraft relative to the overall sound in the vibration signals, and a comparator compares the engine sounds with the overall sound and generates a flight status signal from the result. The flight status signal represents a defined flight status of the aircraft.

The flight sensor according to the invention enhances safety on board aircraft. By generating the flight status signals, electronic components can be correspondingly controlled, so that it is ensured that the respective component cannot transmit during the flight. The invention permits electronic components equipped with the flight sensor according to the invention to independently recognize in a reliable manner whether they are situated in aircraft that is flying, or one that is not. The flight sensor according to the invention therefore cost-effectively and reliably prevents electronic components for use in aircraft from transmitting interfering radio signals. Furthermore, the flight sensor can be implemented in a very small construction, so that it is particularly suitable also as a standardized safety element for electronic components for use in aircraft. This further increases safety and simplifies the authorization procedure for the electronic components.

The flight status signal emitted by the comparator preferably contains information concerning the "flight" or "no flight" as a flight status. On the basis of these two possibilities of the flight status signal, an electronic component can be prevented (or not prevented) from transmitting radio waves.

Particularly on the basis of a decision between only two possible situations, the flight sensor provides a very high degree of safety, while it can be connected with electronic components for use in aircraft in a cost-effective and simple manner.

The filtering device advantageously comprises a low-frequency filter which is designed for the frequency range of the engine sounds. As a result, the engine sounds can be detected in a simple and reliable fashion by means of standard components, so that a cost-effective implementation can be carried out.

The filtering device advantageously comprises a broadband threshold value filter for generating a comparator threshold. As a result, a suitable threshold for the comparator can be generated from all sound signals so that the "flight" or "no flight" status can be detected particularly well, and reliably. In particular, the filtering device preferably comprises at least one RMS converter for converting filter signals to effective values, particularly to proportional direct voltages.

Advantageously, the filtering device comprises a low-frequency channel for determining the fraction of sounds attributable to the engine and a threshold value channel connected parallel to the low-frequency channel for generating a comparator threshold. As a result, the comparator can reliably compare the engine sound with the overall sound and thereby make a decision concerning flight or no flight.

The low-frequency channel preferably comprises a low-frequency filter with a first RMS converter connected on the output side. The reaction time of the flight sensor is an important quantity which is determined in or by the RMS converter of the low-frequency channel. A low reaction time occurs as a result of the special development.

The threshold value channel preferably comprises a threshold value filter having a second RMS converter connected to the output side.

Advantageously, the comparator is connected to the output side of the filtering device and generates a digital output signal as the flight status signal. As a result, the output signal of the comparator is cost-effective and easy to use, and simple interfaces to the corresponding electronic components can also be created.

According to one aspect of the invention, a method of controlling electronic components on board an aircraft comprises the following steps: Detecting structure-borne sound on-board an aircraft; determining the fraction of such engine sound which is attributable to the engine, generating a flight status signal as a function of the engine sound fraction, the flight status signal representing a "flight" or "no flight" status; and controlling an electronic component by means of the flight status signal such that an emission of interfering electromagnetic waves is prevented during flight.

The control method according to the invention enhances aircraft safety, and simplifies and accelerates the authorization process for electronic components.

Engine sound is preferably compared with the entire detected sound and a decision is made with respect to the "flight" or "no flight" status based on the comparison, providing a simple and reliable technique for preventing the emission of interfering electromagnetic waves of electronic components as a function of the flight status.

The electronic component is advantageously switched off when the flight status signal that the aircraft is in flight, ensuring safety on board aircraft in the case of those components which are not required in the flight operation, or must be switched-off.

According to another aspect of the invention, an electronic component is provided for use in aircraft, which electronic component comprises a flight sensor according to the invention as described here.

Other objects, advantages and novel features of the present invention will become apparent from the following detailed description of the invention when considered in conjunction with the accompanying drawings.

BRIEF DESCRIPTION OF THE DRAWINGS

The single FIGURE is a schematic block diagram of a flight sensor according to an embodiment of the invention.

DETAILED DESCRIPTION OF THE DRAWINGS

The flight sensor 10 illustrated in FIG. 1 comprises a vibration sensor 11 which detects structure-borne sound and converts it to electric vibration signals. The vibration sensor 11 is electrically coupled with a filtering device 20 which receives the vibration signals and determines the fraction that is attributable to engine sounds of the aircraft relative to the overall sound in the vibration signals. A comparator 30 is connected to the output side of the filtering device 20 and compares the engine sounds with the overall sound and generates a flight status signal from the result. The flight status signal represents a defined flight status of the aircraft.

In the present example, the flight status determined by the comparator has either the status "1" ("flight") or the status "0" ("no flight"). This digital output signal of the comparator 30 can be used in a particularly simple manner for controlling an electronic component, such as a radio transponder, RFIDs, passive and active electronic components of different types or general components which are suitable for use in aircraft.

The vibration sensor 11 can be implemented, for example, by means of a microphone, by piezoelectric components or other devices which detect structure-borne sound and emit electric signals corresponding to the structure-borne sound. A sensor with a particularly low power consumption, which converts the structure-borne sound to electric signals is selected for this purpose.

The electric vibration signals are fed by way of parallel signal lines 11a, 11b to a low-frequency filter 21 and to a threshold value filter 22. The low-frequency filter 21 is designed for the frequency range of the engine sound, while the threshold value filter 22 is dimensioned to be broad-band for generating the comparator threshold.

RMS converters 23, 24 which are connected to the output side of the low-frequency filter 21 threshold value filter 22, respectively, convert the output signals of the filters 21, 22 to effective values. As a result, proportional direct voltages are generated from the output signals of the filters 21, 22.

The signals or voltages generated by the RMS converters 23, 24 are fed to the comparator 30 which compares the engine sound with the overall sound and decides on this basis whether the "flight" status exists. The reaction time of the flight sensor 10 is determined in the RMS converter 23 of the low-frequency channel which is formed by the low-frequency filter 21 and the RMS converter 23.

A battery 25 is provided for the power supply. It may be, for example, a simple lithium button cell, which can maintain the operation of the entire circuit for several years. The circuit illustrated in the block diagram of FIG. 1 is implemented in nanotechnology, which results in a particularly small construction and in a very low power consumption. Because of the construction and the arrangement of the different elements, very small mechanical dimensions of the flight sensor 10 are obtained which are on the order of the commercially available lithium button cells, or at least are not significantly larger than such lithium button cells.

By means of a suitable control device which receives the flight status signal, the flight sensor 10 prevents unauthorized radio systems from transmitting during the flight.

By way of different criteria, such as the comparison and different spectral regions, the amplitude conditions and the time-related behavior of the different sound signals, the flight sensor according to the invention reliably determines whether the corresponding component is situated in an aircraft that is flying, or in one that is not flying. This recognition is emitted as a digital signal, which prevents an electronic component or a radio transmitter from sending interfering signals.

Because of its relatively simple and particularly small construction, the flight sensor 10 can very easily be connected or combined with electronic components for aircraft. In this manner, the output signal of the flight sensor 10 (the flight status signal) controls the electronic component, so that an emission of interfering electromagnetic waves by the electronic component is prevented when the flight status signal indicates that the aircraft is in flight.

To summarize, for controlling an electronic component in an aircraft, structure-borne sound is detected by a vibration sensor 11, and the fraction thereof that is attributable to the aircraft engine is determined by the filtering device 20. The comparator 30 generates a flight status signal (representing the "flight" or "no flight" status). The electronic component is controlled corresponding to this flight status signal, in order to prevent emission of interfering electromagnetic waves during flight.

The invention utilizes the fact that the main criterion for the flight status is the running of the engines. In particular, the running sounds of the engines characteristically differ from all other sound or vibration sources. By determining the signal fractions or their amplitude ratios and/or their time-related behaviors, the flight status is determined in order to correspondingly control electronic components by means of the received result, so that they can emit no interfering radio waves when they are situated in a flying aircraft. In particular, different characteristic spectral regions in the vibration signals can also be used for determining the flight status.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Flight sensor for controlling electronic components in an aircraft, comprising:
   a vibration sensor for converting structure-borne sound on board said aircraft to electric vibration signals; and
   a comparator for generating a flight status signal representing a defined flight status; wherein,
   a filtering device receives the vibration signals and determines a fraction thereof which is attributable to engine sounds of the aircraft relative to overall sound in the vibration signals;
   the comparator compares the engine sounds with the overall sound and generates the flight status signal based on a result of said comparison.

2. The flight sensor according to claim 1, wherein the flight status signal contains information regarding "a flight" or "no flight" status of the aircraft.

3. The flight sensor according to claim 1, wherein the flight status signal prevents or permits an electronic component's sending of radio waves, depending on said "flight" or "no flight" information.

4. The flight sensor according to claim 1, wherein the filtering device comprises a low-frequency filter which is designed for the frequency range of the engine sounds.

5. The flight sensor according to claim 1, wherein the filtering device comprises a broad-band threshold value filter for generating a comparator threshold.

6. The flight sensor according to claim 1, wherein the filtering device comprises at least one RMS converter for converting filter signals to proportional direct voltages.

7. The flight sensor according to claim 1, wherein the filtering device comprises a low-frequency channel for determining the fraction of the engine sounds and a threshold value channel connected parallel to the low-frequency channel, for generating a comparator threshold.

8. The flight sensor according to claim 7, wherein the low-frequency channel comprises a low-frequency filter with a first RMS converter connected to the output side.

9. The flight sensor according to claim 7, wherein the threshold value channel comprises a threshold value filter with a second RMS converter connected to the output side.

10. The flight sensor according to claim 1, wherein the comparator is connected to the output side of the filtering device and generates a digital output signal as a flight status signal.

11. A method of controlling an electronic component on board an aircraft, said method comprising:
    detecting structure-borne sound on board an aircraft;
    determining a fraction of engine sound of the aircraft in the structure-borne sound;
    as a function of the fraction of engine sound, generating a flight status signal indicating a "flight" or "no flight" status of the aircraft; and,
    controlling said electronic component based on the flight status signal; wherein,
    when said flight status signal indicates the "flight" status, said electronic component is precluded from emitting interfering electromagnetic waves.

12. The method according to claim 11, wherein:
    the engine sound is compared with overall detected sound; and
    on the basis of the comparison, a decision is made with respect to the "flight" or "no flight" status.

13. The method according to claim 11, wherein the electronic component is switched off when the flight status signal represents the "flight" status.

14. The method according to claim 11, wherein:
    said flight status signal is generated by a flight sensor having a vibration sensor for converting structure-borne sound on board said aircraft to electric vibration signals and a comparator for generating a flight status signal representing a defined flight status;
    a filtering device receives the vibration signals and determines a fraction thereof which is attributable to engine sounds of the aircraft relative to overall sound in the vibration signals;
    the comparator compares the engine sounds with the overall sound and generates the flight status signal based on a result of said comparison.

15. An electronic aircraft component that includes a flight sensor for controlling said component, said flight sensor comprising:
    a vibration sensor for converting structure-borne sound on board said aircraft to electric vibration signals; and
    a comparator for generating a flight status signal representing a defined flight status; wherein,
    a filtering device receives the vibration signals and determines a fraction thereof which is attributable to engine sounds of the aircraft relative to overall sound in the vibration signals;
    the comparator compares the engine sounds with the overall sound and generates the flight status signal based on a result of said comparison.

* * * * *

UNITED STATES PATENT AND TRADEMARK OFFICE
CERTIFICATE OF CORRECTION

PATENT NO. : 7,630,799 B2  Page 1 of 1
APPLICATION NO. : 11/597642
DATED : December 8, 2009
INVENTOR(S) : Eder et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 576 days.

Signed and Sealed this

Twenty-first Day of December, 2010

David J. Kappos
*Director of the United States Patent and Trademark Office*